United States Patent
DeShaies et al.

(10) Patent No.: US 11,168,999 B2
(45) Date of Patent: Nov. 9, 2021

(54) SYSTEMS AND METHODS FOR ERROR DETECTION IN CONTACTLESS POSITION SENSING

(71) Applicant: Kongsberg Inc., Shawinigan (CA)

(72) Inventors: William DeShaies, Saint-Léonard d'Aston (CA); Rémi Tétreault, Shawinigan (CA); Bertrand Mallette, Saint-Jean-des-Piles (CA)

(73) Assignee: Kongsberg Inc., Shawinigan (CA)

( * ) Notice: Subject to any disclaimer, the term of this patent is extended or adjusted under 35 U.S.C. 154(b) by 261 days.

(21) Appl. No.: 16/311,359

(22) PCT Filed: Jun. 29, 2016

(86) PCT No.: PCT/IB2016/053904
§ 371 (c)(1),
(2) Date: Dec. 19, 2018

(87) PCT Pub. No.: WO2018/002692
PCT Pub. Date: Jan. 4, 2018

(65) Prior Publication Data
US 2019/0234759 A1 Aug. 1, 2019

(51) Int. Cl.
*G01D 3/08* (2006.01)
*G01D 5/14* (2006.01)
*G01B 7/00* (2006.01)
*G05G 25/00* (2006.01)

(52) U.S. Cl.
CPC .............. *G01D 3/08* (2013.01); *G01B 7/003* (2013.01); *G01D 5/145* (2013.01); *G05G 25/00* (2013.01)

(58) Field of Classification Search
CPC .......... G01D 3/08; G01D 5/142; G01D 5/145; G01D 5/16; G01D 5/20; G01D 5/2006; G01D 5/2013; G01D 5/204; G01D 5/2046; G01D 5/2066; G01D 5/2073; G01D 5/2086; G01B 7/003; G01B 7/14; G05G 25/00

See application file for complete search history.

(56) References Cited

U.S. PATENT DOCUMENTS

| 6,501,375 B1 | 12/2002 | Weant et al. |
| 6,670,807 B2 | 12/2003 | Cox |
| 7,921,729 B2 | 4/2011 | Conner et al. |

(Continued)

FOREIGN PATENT DOCUMENTS

WO WO-2015150965 A1 * 10/2015 ........... G01D 5/2291

OTHER PUBLICATIONS

International Search Report for PCT/IB2016/053904, dated Feb. 24, 2017; 3 pages.

*Primary Examiner* — Jay Patidar
(74) *Attorney, Agent, or Firm* — Howard & Howard Attorneys PLLC

(57) ABSTRACT

Systems, methods, and apparatuses relating to error detection in contactless position sensing are provided. An actuator moves a device between a plurality of predetermined positions. The device is contactlessly detected with a sensor when the device is connected to the actuator. The predetermined position of the device is determined with a controller based on contactless detection of the device by the sensor when the device is connected to the actuator. The device is controlled to become undetectable by the sensor when the device disconnects from the actuator.

21 Claims, 10 Drawing Sheets

(56) References Cited

U.S. PATENT DOCUMENTS

| | | | |
|---|---|---|---|
| 9,175,709 B2 | 11/2015 | Wols | |
| 2001/0052771 A1* | 12/2001 | Jagiella | G01D 5/2013 |
| | | | 324/207.16 |
| 2005/0189938 A1 | 9/2005 | Schley et al. | |
| 2011/0103173 A1* | 5/2011 | May | G01L 3/103 |
| | | | 366/64 |
| 2012/0139531 A1* | 6/2012 | Villano | G01D 5/2291 |
| | | | 324/207.18 |

\* cited by examiner

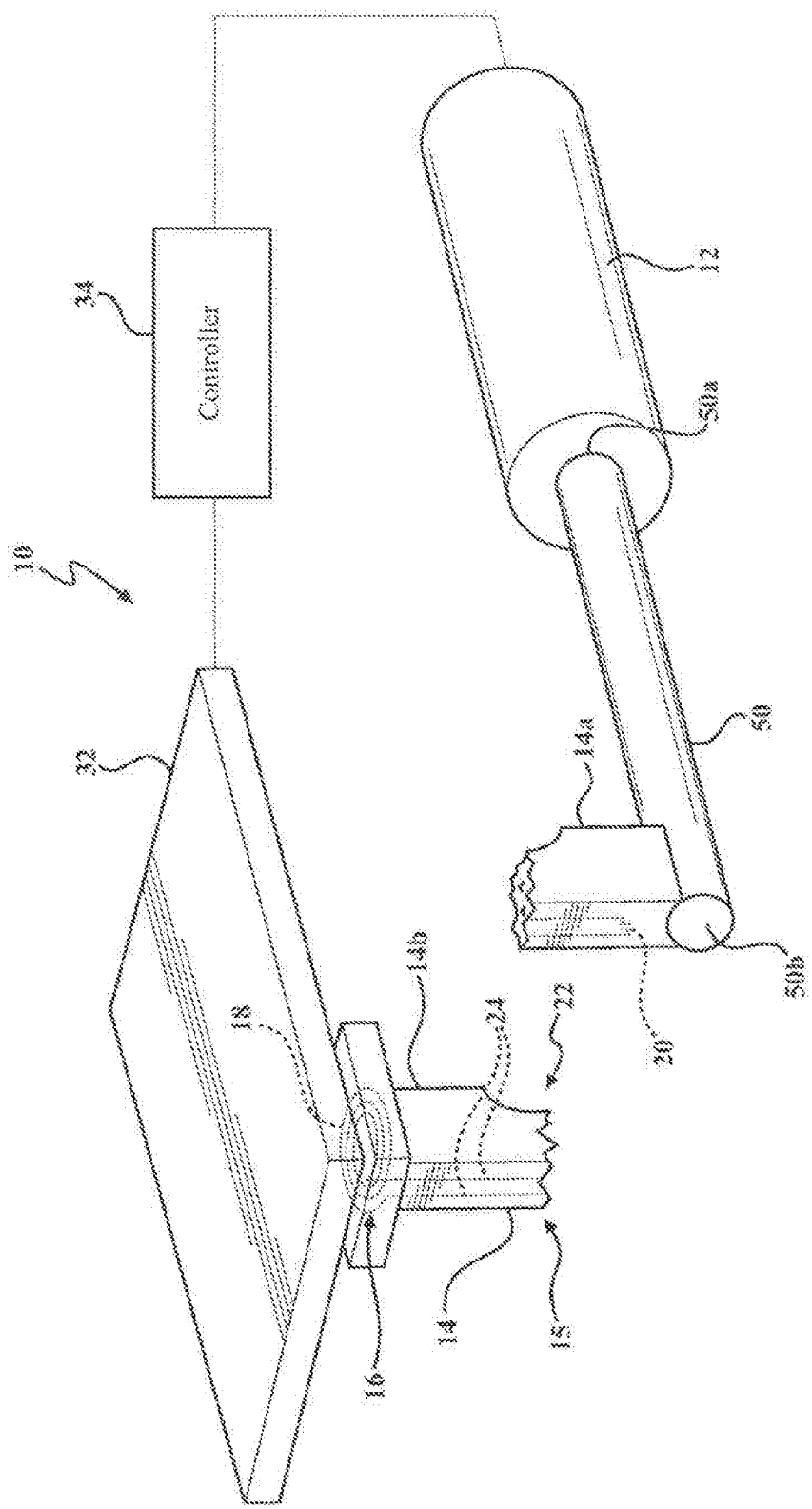

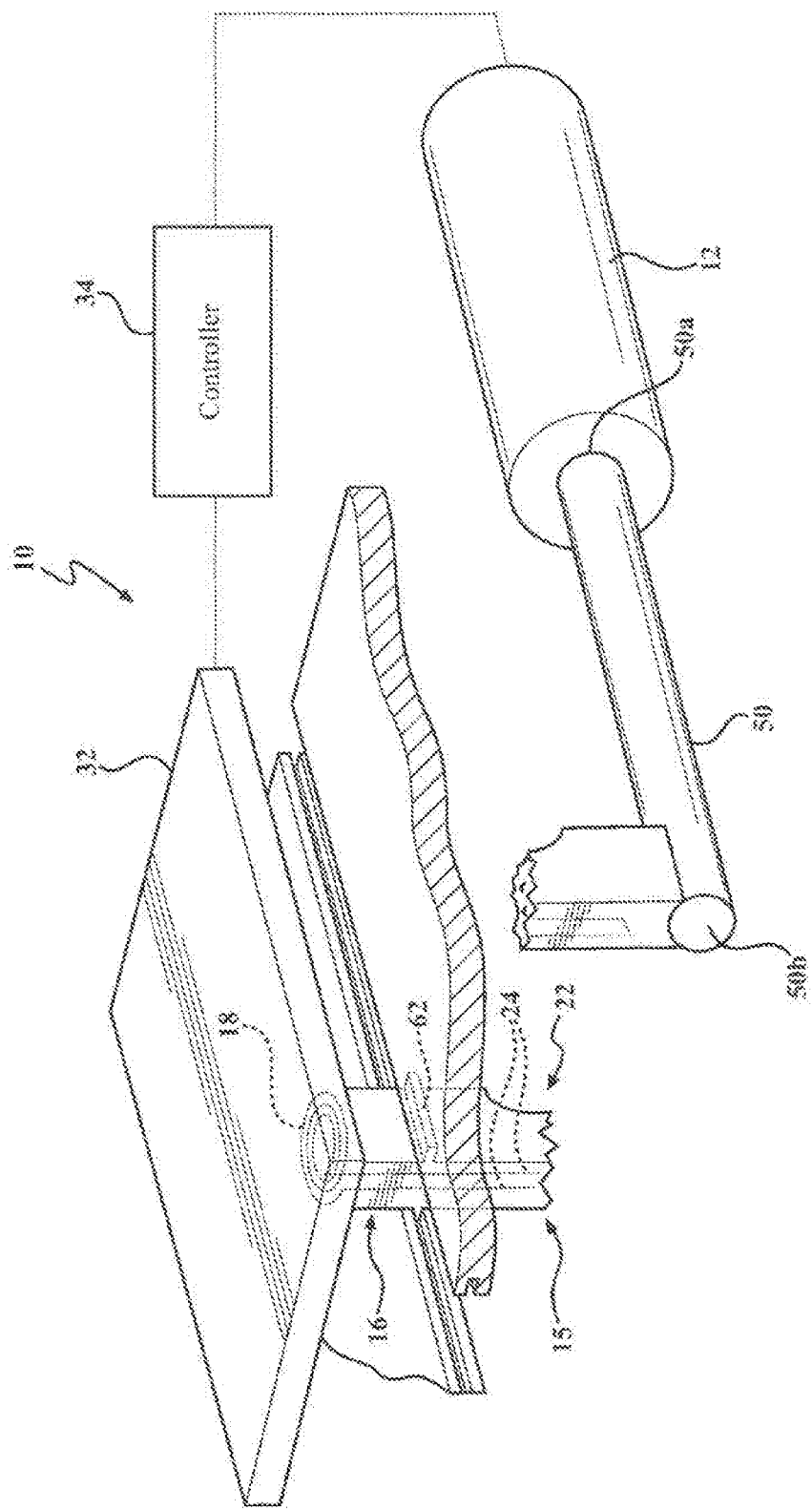

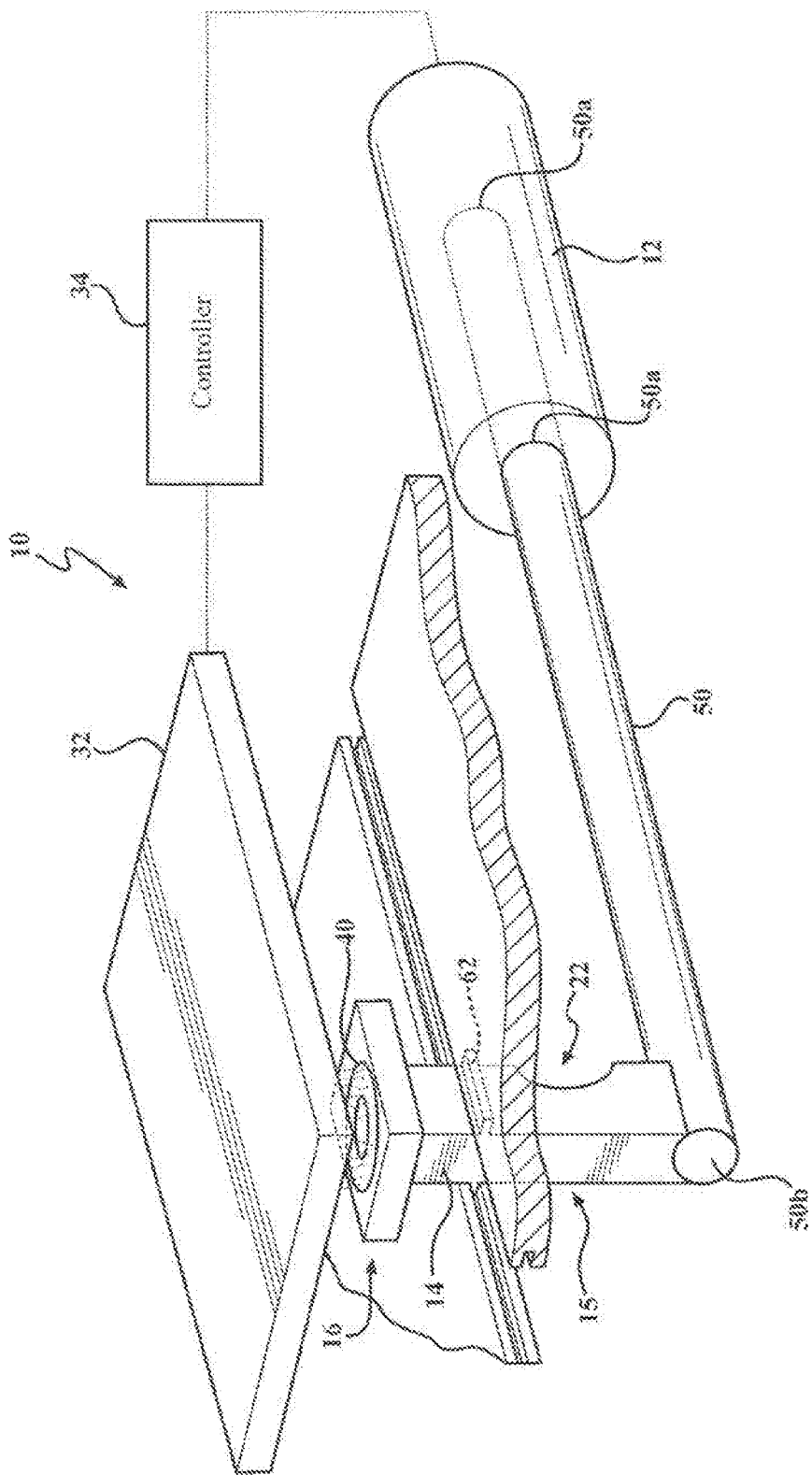

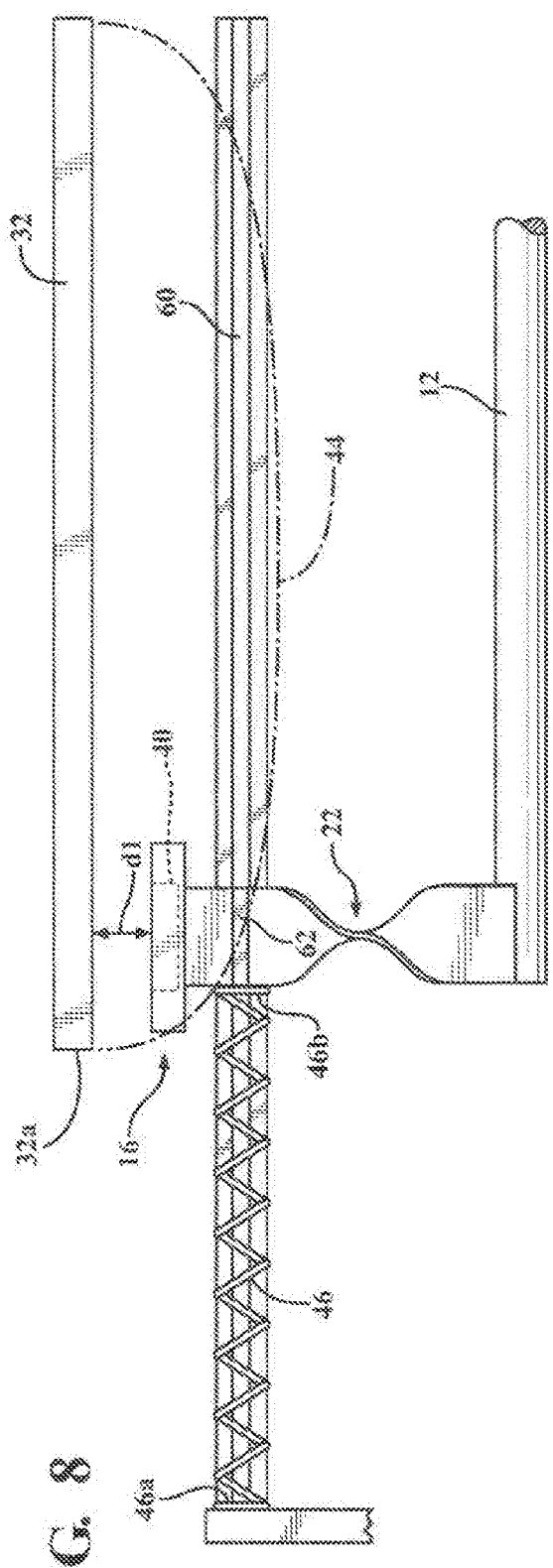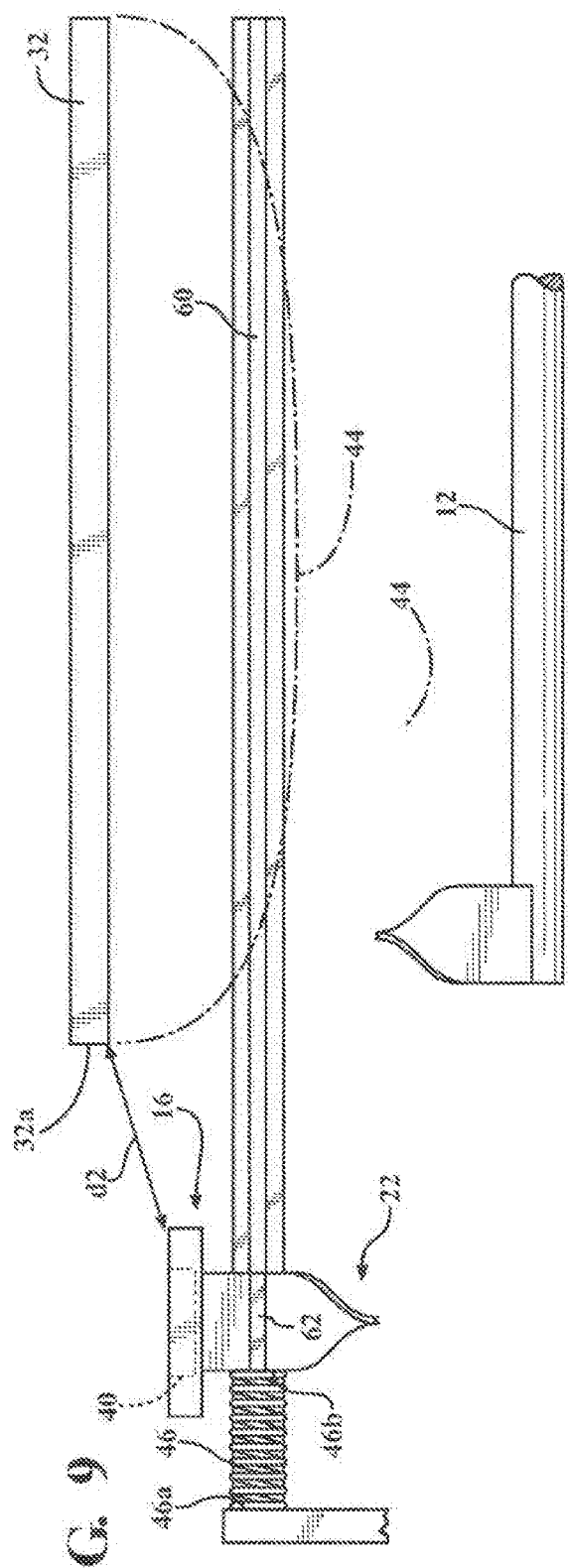

SYSTEMS AND METHODS FOR ERROR DETECTION IN CONTACTLESS POSITION SENSING

BACKGROUND

1. Field of the Invention

The subject invention relates to systems, methods, and apparatuses relating to contactless position sensing, and more specifically, systems, methods and apparatuses for facilitating error detection in contactless position sensing.

2. Description of Related Art

Conventionally, position sensing for systems involve an actuator that moves a push rod back and forth. A link is typically attached to a distal end of the push rod. A target device is attached to the link and is tuned to a specific frequency. A position sensor detects the target device at the specific frequency as the target device moves between positions by virtue of the actuator.

Historically, the link is susceptible to mechanical failure because of sheer force applied to the link resulting from the actuator frequently moving the push rod back and forth. If the link breaks apart from the push rod, the push rod may continue actuating back and forth, yet the link and the target device both remain stationary. In conventional systems, the target device remains tuned to the specific frequency, even if the link disconnects from the push rod. Consequently, the target device remains detectable by the sensor and the sensor detects the target device at an unintended position. This situation causes the system to detect false or erroneous position information because the target device does not change position as the push rod moves. Alternatively, the target device and link may inadvertently move because they are severed from the push rod.

Conventional systems are unable to specifically detect the aforementioned error condition because conventional systems fail to detect that a mechanical failure in the link has occurred. Instead, conventional systems merely compare commands sent to the actuator with the positions returned from the sensor whereby a mismatch between the two triggers an error. While such techniques may account for errors between the actuator and position sensor generally, such techniques do not actively recognize where the error is stemming from or whether there is any mechanical failures in the link itself. Conventional systems fail to adequately account for this condition because the link and/or target devices are not capable of providing or facilitating additional information for active detection of such error, which is particularly important for sensitive applications.

As such, there are opportunities to address at least the aforementioned problems.

SUMMARY

One embodiment of a system is provided wherein the system comprises an actuator and a device being connected to the actuator. The actuator is configured to move the device between a plurality of predetermined positions. A sensor is configured to contactlessly detect the device when the device is connected to the actuator. A controller is in communication with the sensor and is configured to determine the predetermined position of the device based on contactless detection of the device by the sensor when the device is connected to the actuator. The device is controlled to become undetectable by the sensor when the device disconnects from the actuator.

One embodiment of a method of operating a system is provided. The system comprises an actuator, a device connected to the actuator, a sensor, and a controller in communication with the sensor. The method comprises the step of moving the device with the actuator between a plurality of predetermined positions. The method comprises the step of contactlessly detecting the device with the sensor when the device is connected to the actuator. The controller determines the predetermined position of the device based on contactless detection of the device by the sensor when the device is connected to the actuator. The device is controlled to become undetectable by the sensor when the device disconnects from the actuator.

One embodiment of an error-detection method for a system is provided. The system comprises an actuator and a device being connected to the actuator. The actuator is configured to move the device between a plurality of predetermined positions. A controller is in communication with a sensor and the sensor is configured to determine the predetermined position of the device based on contactless detection when the device is connected to the actuator. The device is configured to become undetectable by the sensor when the device disconnects from the actuator. The error-detection method comprises recognizing with the controller an occurrence of an error identifying disconnection of the device from the actuator in response to the device becoming undetectable by the sensor.

The system and methods advantageously provide improved error detection in situations where the device is disconnected from the actuator. By controlling the device to become undetectable by the sensor, the controller is able to detect additional information about the error. That is, by recognizing the undetectability of the device, the controller actively identifies that a predetermined error exists stemming from the device disconnecting from the actuator. The identification of the predetermined error allows necessary measures to be taken to avoid perpetuating false or erroneous position detection resulting from the disconnected device or inadvertent movement of the device. Moreover, the sensor is prevented from detecting the device at an unintended position because the device, when disconnected from the actuator, becomes undetectable, rather than erroneously detectable. Furthermore, the techniques described herein further allow the ability to detect the specific source of the failure, i.e., disconnection of the device from the actuator, for troubleshooting purposes, and the like.

Of course, the system, head wearable device, methods, and computer readable mediums, as described herein may exhibit or provide advantages other than those described above. The advantages described above are not intended to limit the scope of the claimed invention.

BRIEF DESCRIPTION OF THE DRAWINGS

Advantages of the present invention will be readily appreciated, as the same becomes better understood by reference to the following detailed description, when considered in connection with the accompanying drawings.

FIG. 4 is a perspective view, partially in phantom, of the system of FIG. 1 comprising the device of FIG. 2 and wherein the device is broken apart from the actuator at the mechanical weakness thereby causing the device frequency to become undetectable to the sensor, according to one embodiment.

FIG. 6 is a perspective view, partially in phantom, of the system comprising the device riding along a guide member and comprising the RF coil but no capacitor, and wherein the device is broken apart from the actuator at the mechanical weakness thereby causing the device frequency to become undetectable to the sensor, according to another embodiment.

FIG. 7 is a perspective view, partially in phantom, of the system comprising the device having a magnet instead of the RF coil, according to one embodiment.

FIG. 8 is a front view of one embodiment of the system wherein the device is connected to the actuator and is connected to a biasing member and within a detectable range of the sensor.

FIG. 9 is a front view of the system of FIG. 8 wherein the device breaks apart from the actuator and is positioned beyond the detectable range of the sensor by the biasing member, according to one embodiment.

DETAILED DESCRIPTION

Referring to the Figures, wherein like numerals indicate like or corresponding parts throughout the several views, error detection techniques for contactless position sensing systems are provided.

I. System Overview

Figure 1:
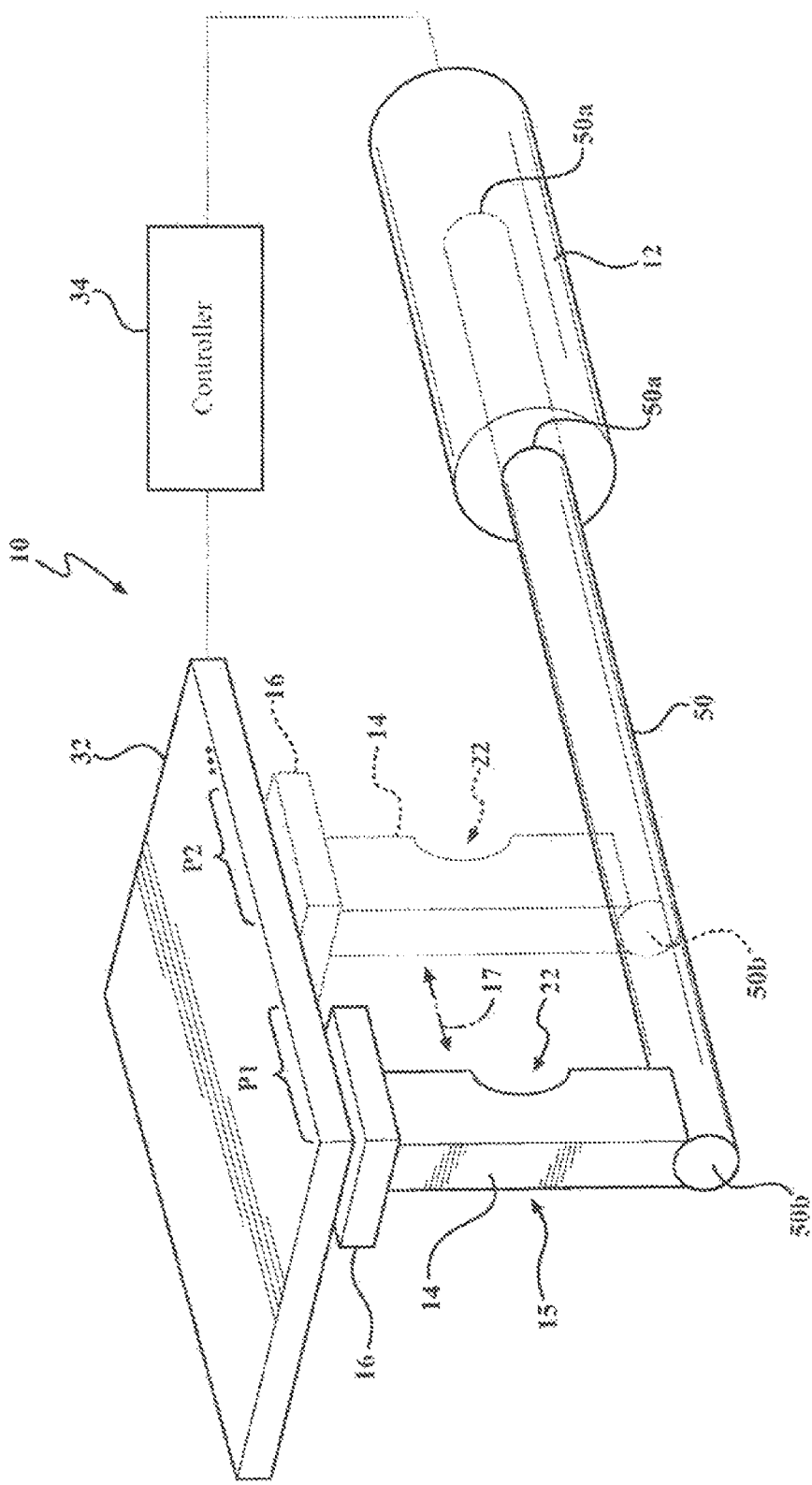
FIG. 1 is a perspective view, partially in phantom, of a system comprising an actuator for moving a device and a sensor for detecting position of the device, according to one embodiment.

FIG. 1 illustrates one embodiment of a system 10 for contactless position sensing. The system 10 comprises an actuator 12 and an arm 14, which is optionally connectable to the actuator 12. The actuator 12 is configured to move the arm 14.

A device 16 connects to the actuator 12. In one embodiment, the device 16 is integrated with or connected to the arm 14. As such, by moving the arm 14, the actuator 12 concurrently moves the device 16. Alternatively, the device 16 may be directly connected to the actuator 12 or components integral to the actuator 12 such that the arm 14 is not required.

The device 16 moves between any suitable number of predetermined positions (P1, P2 . . . ) or between a range of positions. The device 16 moves between the positions (P) according to a predetermined path 17 as defined and restricted by the actuator 12. Thus, movement of the device 16 is not random.

A sensor 32 is configured to contactlessly detect the device 16 when the device 16 is connected to the actuator 16. That is, the sensor 32 is spaced apart from the device 16 and the device 16 moves adjacent to the sensor 32 such that the sensor 32 detects the presence of the device 16 at any of the positions (P) without directly or physically contacting or abutting the device 16.

To implement such a contactless detection, the sensor 32 remains spaced from the device 16 to define an air gap between the sensor 32 and the device 16 as the device 16 moves between the positions (P), as shown in FIG. 1. The sensor 32 may continuously detects whether the device 16 is present. Spacing between the device 16 and the sensor 32 allows free movement of the device 16 between the positions (P). The sensor 32, according to one embodiment, is further defined as a position sensor, such as an RF sensor, an inductive sensor, magnetic sensor, magnetoresistive sensor, or the like.

A controller 34 is in communication with the sensor 32 and is configured to determine the position of the device 16 in response to contactless detection of the device 16 by the sensor 32. The controller 34 makes such position determinations when the device 16 remains connected to the actuator 12. The controller 34 receives measurements from the sensor 32 and may analyze the measurements to determine position (P) of the device 16. Depending on the application, the position (P) of the device 16 is detected to allow determinations to be made relating to the position (P).

As shown in FIG. 4, there exists a possibility that the device 16, and possibly part of the arm 14, may break (mechanically fail) in relation to the actuator 12 because the device 12 and the arm 14 are subjected to movement driven by the actuator 12. Such breakage may result in complete severance of the arm 14, and ultimately the device 16, from the actuator 12, as shown. Such breakage may alternatively result in partial disconnection of the arm 14 from the actuator 12 nevertheless resulting in failure of the original mechanical link between the actuator 12 and the device 16.

To address this failure mode, the device 16 is controlled to become undetectable by the sensor 32 when the device 16 disconnects from the actuator 12. That is, the device 16 is intentionally manipulated to make the device 16 undetectable by the sensor 32. Such intentional manipulation is desired and is contrasted to an unintentional and undesired manipulation of the device 16 in the event of breakage wherein the device 16 may become undetectable simply by virtue of the device 16, for example, inadvertently falling into a housing in which the device 16 rests after breakage. Specific embodiments explaining how the device 16 is controlled to become undetectable by the sensor 32 when the device 16 disconnects from the actuator 12 are provided below.

II. Frequency Alternation Embodiments

In one embodiment, as shown in FIGS. 2-6, the device 16 is configured to emit a radio frequency (hereinafter "RF") signal. Hence, the device 16 operates at an operating frequency. The sensor 32 is configured to detect the device 16 within a detectable range of frequencies. That is, during normal operation when the device 16 remains connected to the actuator 12, the operating frequency of the device 16 is within the detectable range of the sensor 32. Additional details are provided in detail below.

Figure 2:
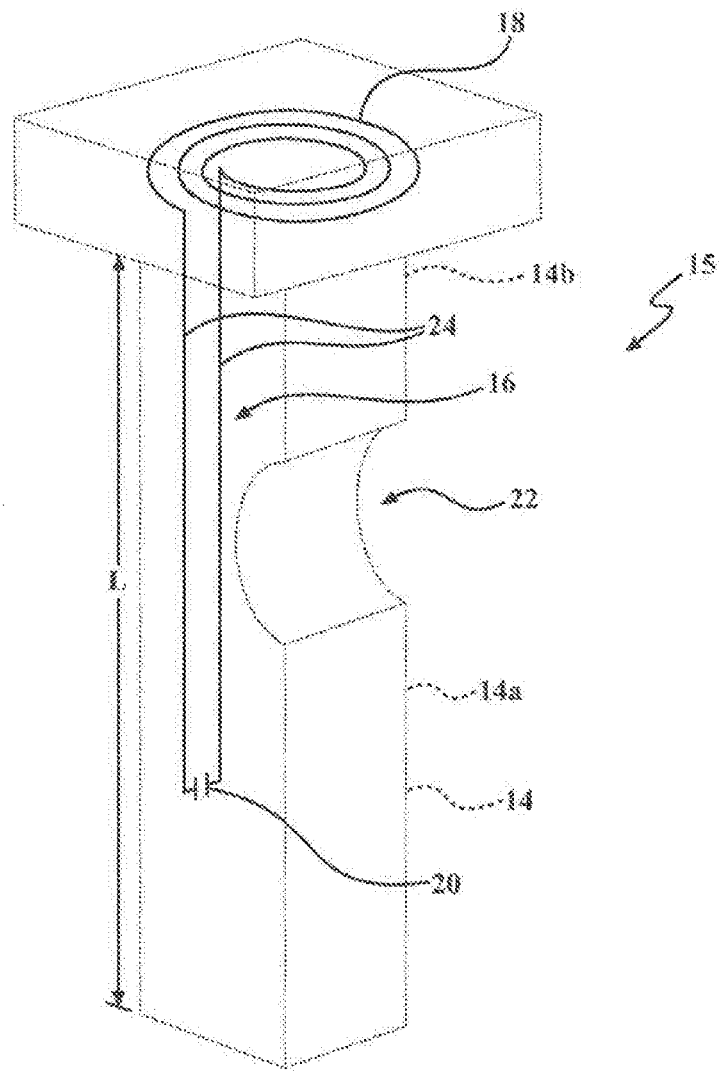
FIG. 2 is a perspective view, partially in phantom, of the device of the system comprising a mechanical weakness and an RF coil and capacitor for facilitating position and error detection, according to one embodiment.

As shown in one embodiment in FIG. 2, the device 16 comprises a radio frequency coil 18 and a capacitor 20. The RF coil 18 is configured to transmit and/or receive electromagnetic waves and comprises a winding, loop or coil of conductive material configured to possesses inductance. The capacitor 20 is used to store an electric charge and comprises one or more pairs of conductors separated by an insulator. The capacitor 20 may not be directly configured to transmit and/or receive electromagnetic waves. However, the capacitor 20 has a material effect on transmission or reception of electromagnetic waves by the RF coil 18, as will be described below. The RF coil 18 and the capacitor 20 are typically separate electrical components. However, the RF coil 18 and the capacitor 20 can be integrated as sub-parts of a greater electrical component.

In some embodiments, the arm 14 and the device 16, and any sub-components of the same otherwise described herein, may collectively be defined as an apparatus 15. In other embodiments, the arm 14, the device 16, the actuator 12, and any sub-components of the same otherwise described herein, may collectively be defined as the apparatus 15.

In some situations, the device 16 is defined solely by the RF coil 18. In other situations, the device 16 is defined by a combination of the RF coil 18 and the capacitor 20. These situations are described in detail below.

In this embodiment, the device 16 is controlled to become undetectable by the sensor 32 by controllably altering the operating frequency of the device 16 beyond the detectable range of the sensor 32 when the device 16 disconnects from the actuator 12.

Such controllable alteration is accomplished by one of many techniques. In one embodiment, the arm 14 includes a mechanical weakness 22 intentionally defined along at least a portion of a length (L) of the arm 14. The mechanical weakness 22 is configured to provide a weak portion in the arm 14 such that if the arm 14 were to break, the arm 14 would break at the location of the mechanical weakness 22. In other words, breakage is mechanically directed at the mechanical weakness 22 to avoid random, and otherwise undesired, breakage at other parts of the arm 14 and/or device 16.

The arm 14 includes a conductive element 24 that is electrically connectable between the RF coil 18 and the capacitor 20. That is, when connected, the conductive element 24 electrically connects the RF coil 18 and the capacitor 20. The RF coil 18 is located at the arm 14 on one side of the mechanical weakness 22. The capacitor 20 is located at the arm 14 at an opposing side of the mechanical weakness 22. As such, the conductive element 24 extends across the mechanical weakness 22.

The conductive element 24 may be configured in various ways. In one example, as shown in FIG. 2, the conductive element 24 is embedded within the arm 14. The conductive element 24 may be positioned adjacent to the mechanical weakness 22 according to any suitable distance to allow all or part of the conductive element 24 to break in response to breakage at the mechanical weakness 22. In other embodiments, the conductive element 24 may be over-molded in or on the arm 14 using any suitable technique.

The conductive element 24 may additionally be comprised of any suitable material. In one example, the conductive element 24 comprises tin. However, the conductive element 24 may comprise any suitable conductive material, such as copper, and the like. The conductive element 24 may also be formed of wire, conductive traces, or the like.

Figure 3:
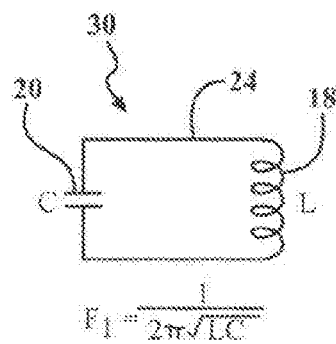
FIG. 3 is a schematic of a closed circuit representing the electrical components in the device of FIG. 2 when the device is unbroken, according to one embodiment.

As shown in FIG. 3, the RF coil 18 and the capacitor 20 collectively define a closed electrical circuit 30. As shown in FIG. 3, the closed circuit 30 is more specifically an LC circuit comprising an inductor, represented by the letter L, and a capacitor, represented by the letter C, connected together in parallel. The parallel configuration of the closed circuit 30 is facilitated by the conductive element 24, which forms part of the closed circuit 30. The inductor L is a circuit equivalent representation of the RF coil 18. The closed circuit 30 may operate as resonance circuit configured to continually collapse magnetic field of the inductor L to generate an electric current in the RF coil 18 that charges the capacitor 20, and then the discharge the capacitor 20 to provide electric current that builds the magnetic field in the inductor L.

When the device 16 is connected to (directly or indirectly) the actuator 12 and remains connected to the actuator 12, the circuit 30 remains closed because the conductive element 24 between the RF coil 18 and the capacitor 20 remains in tact and electrically connected. In this situation, the device 16 is configured to operate according to a first predetermined frequency. Specifically, the closed circuit 30 is tuned to the first frequency, and more specifically, the RF coil 18 and the capacitor 20 collectively, are tuned to the first frequency. The device 16 may actively or passively transmit and/or receive radio frequency waves at the first predetermined frequency (F1). In some embodiments, the first frequency F1 is further defined as a plurality or range of first frequencies. The first frequency F1 may alternatively be a single frequency. The first frequency F1 is within the detectable range of the sensor 32.

The first frequency F1 in some embodiments is also a resonance frequency based on the closed resonance LC circuit described above. For example, the first frequency F1 may be defined by the following equation $$F_1 = \frac{1}{2\pi\sqrt{LC}}$$

wherein L represents the inductance of the RF coil 18 and C represents the capacitance of the capacitor 20. In other embodiments, the first frequency F1 may be any other suitable frequency besides a resonance frequency.

As shown in FIG. 4, the arm 14 may break (mechanically fail) in relation to the actuator 12 because the arm 14 is subjected to movement driven by the actuator 12. To address this failure mode, the arm 14 is configured to break specifically at the mechanical weakness 22, rather than at other parts of the arm 14, as described above. By directing the arm 14 to break, partially, or entirely, at the mechanical weakness 22, the conductive element 24, which is defined across the mechanical weakness 22 also breaks. Since the conductive element 24 forms part of the closed circuit 30, the closed circuit 30 consequently becomes an open. The conductive element 24 breaks, thereby disconnecting the RF coil 18 and capacitor 20.

Figure 5:
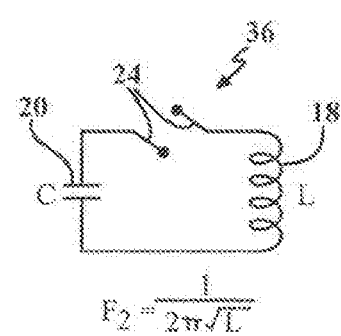
FIG. 5 is a schematic of an open electrical circuit representing the electrical components in the device of FIG. 4 after the device is broken at the mechanical weakness, according to one embodiment.

In one embodiment, as shown in FIG. 5, an open circuit 36 is formed after the conductive element 24 breaks at the mechanical weakness 22. The open circuit 36 is more specifically an inductive circuit comprising the inductor, L. The capacitive component C, otherwise present in the closed circuit 36 becomes disconnected from the inductive component L by severance of the conductive element 24. As such, the capacitor 20 has no effect or negligible effect on operation of the RF coil 18.

It is to be appreciated that the conductive element 24 may be entirely severed because of breakage such that the RF coil 18 is completely disconnected from the capacitor 20, as shown in FIG. 4. Alternatively, the conductive element 24 may be severed partially. For example, one trace of the conductive element 24 may remain in tact, while another trace of the conductive element 24 is severed because of breakage such that the RF coil 18 is partially disconnected from the capacitor 20, as shown in the schematic in FIG. 5. In either instance, the capacitor 20 still has no effect or negligible effect on operation of the RF coil 18. Thus, when it is said that the RF coil 18 and capacitor 20 collectively define the open circuit 36, it is to be understood that the capacitor 20 can be partially or completely disconnected from the RF coil 18.

In this embodiment, the most significant component from the standpoint of being disconnected from the actuator 12 is the RF coil 18. Thus, in FIG. 4, for example, the upper portion 14b of the arm 14, which disconnects from the actuator 12, preserves the RF coil 18. Meanwhile, the lower portion 14a, which remains connected to the actuator 12, includes the capacitor 20. Those skilled in the art appreciate that in other embodiments, the arm 14 may preserve both the RF coil 18 and the capacitor 20 upon disconnection from the actuator 12, while at the same time allowing the RF coil 18 to electrically disconnect from the capacitor 20. For example, such situations may occur when an entirety of the arm 14 disconnects from the actuator 12 but where the mechanical weakness 22 nonetheless causes all or part of the conductive element 24 to break.

In this breakage situation, the device 16 is configured to operate according to a second predetermined frequency F2. Specifically, the open circuit 36 is tuned to the second frequency F2, and more specifically, the RF coil 18 is tuned to the second frequency F2 independent from influence by the capacitor 20.

In this embodiment, just as with the first predetermined frequency, F1, the device 16 may actively or passively transmit and/or received radio frequency waves at the second predetermined frequency F2. The second frequency F2 may be a single frequency or a plurality of range of second frequencies. In one embodiment, the second frequency F2 is intentionally set to any non-zero frequency or to 0 Hz. The second predetermined frequency F2 is selected deliberately to be different than the first predetermined frequency F1 such that the sensor 32 and/or controller 34 can distinguish scenarios when the device 16 is connected to or disconnected from the actuator 12. The second frequency F2 may be greater than or less than the first predetermined frequency F1.

Most critically, the second frequency F2 is specifically configured such that it is outside of the detectable range of the sensor 32 in the scenario when the device 16 disconnects from the actuator 12. In other words, the sensor 32 cannot detect the predetermined position of the device 16 when the device 16 operates at the second frequency F2. The second frequency F2 is configured such that position detection of the device 16 is effectively disabled.

As described, when the arm 14 breaks apart from the actuator 12, the RF coil 18 generally operates independent of the capacitor 20. Despite disconnection of the capacitor 20, the open circuit 36 may nevertheless operate as a resonance circuit configured to continually collapse magnetic field of the inductor L to generate an electric current in the RF coil 18 and to provide electric current that builds the magnetic field in the inductor L. Accordingly, in some embodiments, the second frequency F2 may be a resonance frequency based on the open circuit 36 described above. For example, the second frequency F2 may be defined by the following equation $$F_1 = \frac{1}{2\pi\sqrt{L}}$$

wherein L represents the inductance of the RF coil 18. In other embodiments, the second frequency F2 may be any other suitable frequency besides a resonance frequency, such as a non-zero frequency, as described above.

In another embodiment, as shown in FIG. 6, the device 16 operates at the first frequency F1 when the device 16 remains connected to the actuator 12. However, when the device 16 disconnects from the actuator 12, the device 16 is controlled to be intentionally destroyed. In this embodiment, the RF coil 18 may be channeled through or across the mechanical weakness 22. The mechanical weakness 22 may be defined into the arm 14, as described above. Alternatively, as shown in FIG. 6, the mechanical weakness 22 may be defined into the device 16 itself. In this embodiment, the device 16 may comprise solely the RF coil 18 circuit such that there is no need for the capacitor 20, as shown in FIG. 4. As such, in this embodiment, there may be no need for a separate arm 14 because the device 16 is elongated effectively to define an arm configuration. Any of the parts described herein relating to the arm 14 may apply equally to the device 16 when the device 16 has an arm-like configuration. Furthermore, as shown, the device 16 may be integrated to parts of the actuator 12.

By directing the device 16 to break, partially, or entirely, at the mechanical weakness 22, the RF coil 18, which is defined across the mechanical weakness 22 also breaks. This breakage causes the RF coil 18 to become an open circuit. In turn, the RF coil 18 is controlled to become inoperable or controllably destroyed such that the RF coil 18 no longer operates at the first frequency F1. As such, the RF coil 18 becomes undetectable by the sensor 32.

Furthermore, those skilled in the art appreciate that the device 16 may be controllably destroyed according to other similar techniques leveraging mechanical breakage of the device 16 and/or arm 14 to intentionally manipulate the device 16 such that the device 16 is beyond the detectable range of the sensor 32.

In one embodiment, as shown in FIG. 6, a guide member 60 may be provided to guide movement of the device 16 between the plurality of predetermined positions and to support the device 16 after disconnection of the device 16 from the actuator 12. The guide member 60 is generally independent from the actuator 12. The arm 14 and/or device 16 may ride along the guide member 60 such that if breakage were to occur, the general attachment of the arm 14 and/or device 16 to the system 10 is maintained. This avoids the arm 14 and/or device 16 undesirably falling to parts of the system 10 thereby potentially causing damage. The device 16 may be slidably engaged with the guide member 60 according to any suitable manner. As shown according to one embodiment, the device 16 may comprise a guide element 62 to slidably engage the guide member 60. The guide element 62 may be an integral part of the device 16 or may be a separate component attached to the device 16. The guide member 60 and guide element 62 may comprise any suitable configuration other than shown and described. The guide member 60 may have any suitable configuration for supporting and guiding the device 16.

For any of the embodiments described above, the controller 34 is responsive to undetectability of the device 16 when the device 16 disconnects from the actuator 12. Specifically, once the device 16 is controlled to become undetectable by having its operating frequency controllably altered to be beyond the detectable range of the sensor 32, the controller 34 is configured to identify that a predetermined error has occurred. Where the second frequency F2 is used, it is dedicated solely to the identification of the predetermined error, rather than position detection.

In one embodiment, the predetermined error identifies something more than just a general failure in the system 10. Rather, the predetermined error may specifically identify that the arm 14 and/or device 16 has disconnected from the actuator 12.

III. Positioning Alteration Embodiments

In yet another embodiment, as shown in FIGS. 7-9, the device 16 is controlled to become undetectable by being controllably positioned beyond a detectable range 44 of the sensor 32 when the device 16 disconnects from the actuator 12. In this embodiment, the device 16 may operate according to methods other than RF-based techniques. Many of the same features of the actuator 12, arm 14, and device 16 described above may be present in this embodiment.

In one embodiment, as shown in FIG. 7, the device 16 is configured to exhibit at least one of an inductive field and a magnetic field. For example, the device 16 may comprise a magnet 40. The magnet 40 may have any suitable configuration and any suitable polarization for exhibiting any suitable magnetic field. Alternatively, the device 16 may comprise any suitable number of magnets 40 in conjunction with any suitable number of inductor(s). The device 16 may be passive or active. When passive, the device 16 passively exhibits the magnetic and/or inductive field. When active, the device 16 may be energized to exhibit any suitable electro-magnetic and/or electro-inductive field.

The sensor 32 may have suitable configuration to detect presence of the inductive an/or magnetic field from the device 16. For example, the sensor 32 may be a magnetic field sensor and/or an inductive field sensor. As such, the sensor 32 is configured to contactlessly detect the device 16 by detecting the field exhibited by the device 16 when the device is connected to the actuator 12.

As shown in FIGS. 8 and 9, the sensor 32 defines a range 44 wherein the sensor 32 is able to detect presence of the device 16. Unlike the range defined above for the frequency-based configuration, the range 44 of the sensor 32 in this configuration is more sensitive to a distance of the device 16 from the sensor 32 because the sensor 32 is detecting a magnetic and/or inductive field strength independent of frequency.

In FIG. 8, the device 16 remains connected to the actuator 12. As shown, the device 16 is spaced apart from the sensor 32 by first predetermined distance d1 being within the detectable range 44 of the sensor when the device 16 is connected to the actuator 12. The first predetermined distance d1 may be consistent throughout normal operation of the device 16 as the device 16 is detected by the sensor 32. In one embodiment, the first predetermined distance d1 is defined between a lower portion of the sensor 32 and an upper portion of the device 16. The first predetermined distance d1 may be defined according to any other suitable distance between the device 16 and sensor 32.

As described above, the device 16 may break apart from the actuator 12. If this happens, the device 16, according to this embodiment, is controllably repositioned after breakage such that the device 16 is placed out of range 44 of the sensor 32, as shown in FIG. 9. As such, the field exhibited by the device 16 is made undetectable by the sensor 32 when the device 16 disconnects from the actuator 12.

In one embodiment, as shown in FIGS. 7-9, the guide member 60 may be provided to further facilitate repositioning of the device 16 after breakage. The guide member 60 may be defined linearly in parallel with the sensor 32, as shown. The guide member 60 may also extend along the length of the sensor 32 and beyond an end 32a of the sensor 32. The guide member 60 may be provided for any suitable embodiment and is not exclusive to position alteration embodiments of this section. In other words, the guide member 60 may also be provided for embodiments where frequency alteration is provided for the device 16.

To implement repositioning, a biasing member 46 may be mechanically linked with the device 16. The biasing member 46 may be further defined as a spring, and more specifically, a coil spring, leaf spring, torsion spring, or the like. In one embodiment, as shown in FIGS. 8 and 9, the biasing member 46 is fixed to the guide member 60 to provide anchoring for a first end 46a of the biasing member 46. It is to be appreciated that the first end 46a of the biasing member 46 may be anchored to any other suitable fixed member other than the guide member 60 to implement repositioning.

A second, opposing end 46b of the biasing member 46 may be fixed to the device 16. Specifically, the send end 46b is preferably fixed to a portion of the device 16 and/or arm 14 that remains after breakage from the actuator 12. For example, if the mechanical weakness 22 is present, the second end 46b is connected to the upper portion 14b of the arm 14 or the upper portion of the device 16, which is above the mechanical weakness 22, as shown in FIGS. 8 and 9. It is to be appreciated that the second end 46b of the biasing member 46 may be anchored to any other suitable fixed component other than the device 16 to implement repositioning. For example, the second end 46b may be fixed to the arm 14, or the like. Furthermore, the biasing member 46 may be integrated into the device 16 and/or arm 14 or disposed entirely outside of the device 16 and/or arm 14.

The biasing member 46 is configured to controllably position the device 16 beyond the detectable range 44 of the sensor 32 in response to the device 16 disconnecting from the actuator 12. That is, the biasing member 46 pushes and/or pulls the device 16 by using spring biasing force that is exerted or released upon breakage of the device 16 from the actuator.

The biasing member 46 preferably exhibits a spring constant that is sufficient to allow free movement of the device 16 between the predetermined positions. That is, the spring constant should be sufficiently small so as to not interfere with actuator 12 movement yet large enough to allow repositioning of the device 16 after breakage.

The biasing member 46 may be disposed according to any suitable configuration with respect to the device 16. In one embodiment, as shown in FIGS. 8 and 9, the biasing member 46 is disposed horizontally, or in parallel with the directional movement of the device 16. In such embodiments, the biasing member 46 is configured to move the device 16 out of range 44 in a horizontal or parallel direction with respect to movement of the device 16. Alternatively, the biasing member 46 may be disposed perpendicularly with respect to the device 16. In such embodiments, the biasing member 46 is configured to move the device 16 out of range 44 in a perpendicular direction with respect to movement of the device 16.

To illustrate repositioning, the device 16 is connected to the actuator 12 in FIG. 8 and the biasing member 46 is in a first state. In this example, as shown, the biasing member 46 is a coil spring, which is in an extended state. The biasing member 46 is biased towards compression. Movement of the device 16 between the predetermined positions causes the biasing member 46 to extend and compress depending upon the distance between the first and second anchored ends 46a, 46b of the biasing member 46. Again, the device 16 is spaced at the first predetermined distance d1, which is within the range 44 of the sensor 32.

In FIG. 9, the device 16 is controlled to become spaced apart from the sensor 32 by a second predetermined distance d2 being beyond the detectable range 44 of the sensor 32 when the device 16 disconnects from the actuator 12. Specifically, the biasing member 46 is in a second state, which is a compressed state in this example. Since the biasing member 46 is compression biased, the biasing member 46 pulls the device 16 because the device 16 is detached from the actuator 12, and hence, is free to move independent of the actuator 12. The biasing member 46 pulls the device 16 to the second predetermined distance d2 and out of range 44 such that device 16 is undetectable.

Of course, depending on the biasing member 16 configuration and relationship to the device 16, such repositioning may be implemented according to various other ways. For example, the biasing member 16 alternatively may be extension biased such that the biasing member 16 pushes the device 16 out of range 44.

Furthermore, the device 16 may be repositioned using other mechanisms besides passive springs. For example, magnetic forces, electro-magnetic forces, and/or inductive forces additionally or alternatively may be utilized to reposition the device 16.

Those skilled in the art appreciate that the various components of the system 10 and/or apparatus 15 described herein may have other configurations not specifically recited herein without departing from the spirit of the invention. Moreover, the advantages of the system 10 and/or apparatus 15 are not limited to those described herein. As such, those skilled in the art appreciate that the system 10 and/or apparatus 15 may provide other advantages not specifically recited herein.

IV. Method Overview

Figure 10:
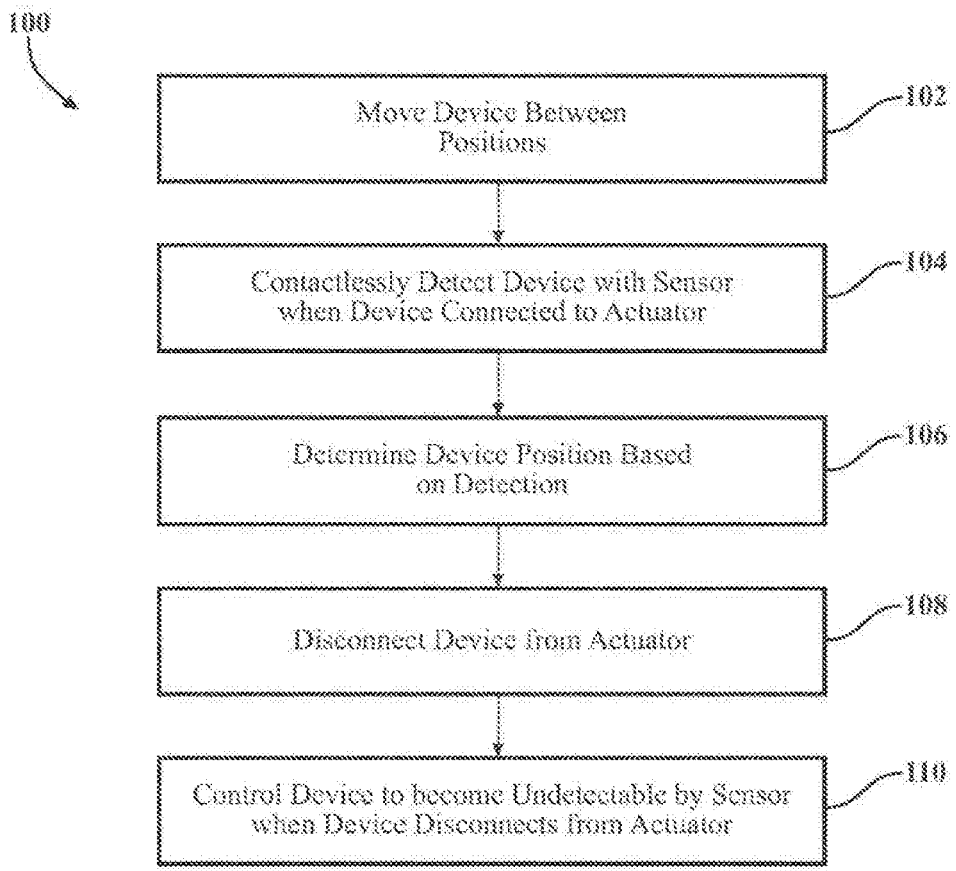
FIG. 10 is a flow chart of a method of operating the system, according to one embodiment.

In accordance with the components described above, a method 100 of operating the system 10 is described herein wherein the steps of the method 100 are illustrated in FIG. 10. At step 102, the device 16 moves between the plurality of positions (P) via the actuator 12. At step 104, the sensor 32 contactlessly detects the device 16 when the device 16 is connected to the actuator 12. At step 106, the controller 34 determines the position (P) of the device 16 based on contactless detection of the device 16 by the sensor 32. At step 108, the arm 14 disconnects from the actuation 12. At step 110, the device 16 is controlled to become undetectable by the sensor 32 when the device 16 disconnects from the actuator 12.

Figure 11:
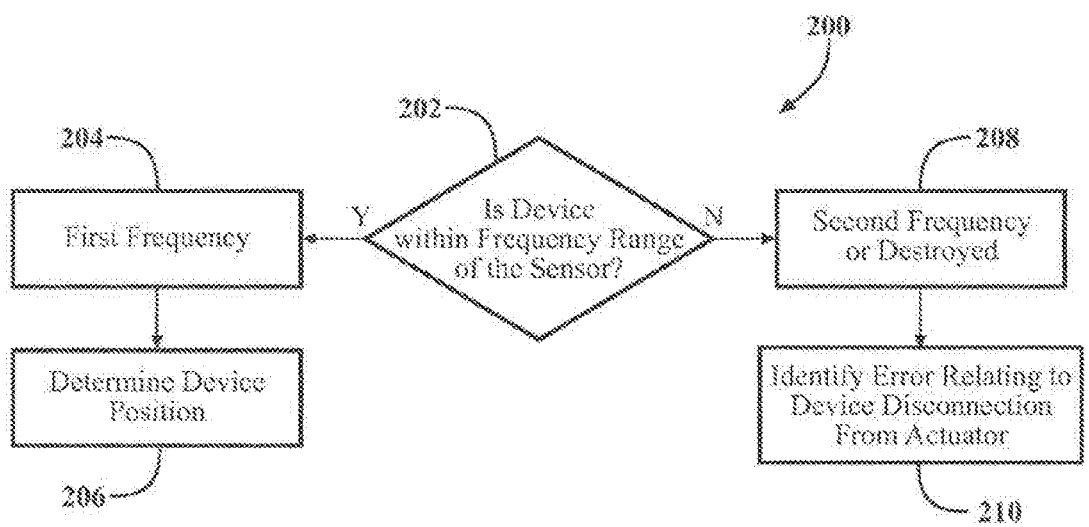
FIG. 11 is a flow chart of an error detection method of the system according to one embodiment wherein the frequency of the device is controllably altered to be beyond the detectable range of the sensor after disconnecting from the actuator.

FIG. 11 illustrates an error-detection method 200 for RF alteration embodiments described herein. At step 202, the controller 34 determines whether or not the device 16 is within detectable frequency range 44 of the sensor 32. If the device 16 is within detectable range 44, the device 16 is operating at the first frequency F1, at step 204, and the controller 34 determines the position (P) of the device 16 at step 206. Otherwise, if at step 202, the controller 34 determines that the device 16 is beyond detectable frequency range 44, then the device 16 is either destroyed or operating at the second frequency F2, as shown at step 208. At step 210, the controller 34 identifies that the predetermined error has occurred relating to disconnection of the device 16 from the actuator 12.

Figure 12:
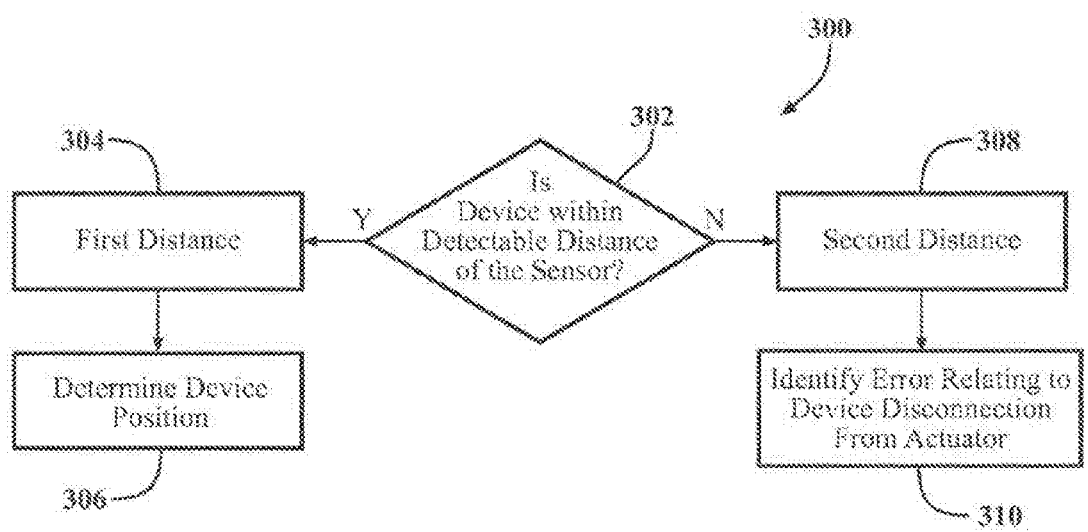
FIG. 12 is a flow chart of an error detection method of the system according to another embodiment wherein the position of the device is controllably manipulated to be beyond the detectable range of the sensor after disconnecting from the actuator.

FIG. 12 illustrates another error-detection method 300 for position alternation embodiments described herein. At step 302, the controller 34 determines whether or not the device 16 is within detectable distance or positional range 44 of the sensor 32. If the device 16 is within detectable range 44, the device 16 is positioned at the first distance d1, at step 304, and the controller 34 determines the position (P) of the device 16 at step 306. Otherwise if at step 302, the controller 34 determines that the device 16 is beyond detectable distance or positional range 44, then the device 16 position was intentionally altered to be at the second distance d2, as shown at step 308. At step 310, the controller 34 identifies that the predetermined error has occurred relating to disconnection of the device 16 from the actuator 12.

As such, the system 10, methods 100, 200, and apparatus 15 provide improved error detection in situations where the device 16 and/or arm 14 is disconnected from the actuator 12. By intentionally destroying the device 16, by causing the device 16 to operate at the second predetermined frequency F2, and/or by repositioning the device 16 to the second distance d2, the controller 34 is able to detect the predetermined error specifically identifying failure resulting from the device 16 and/or arm 14 disconnecting from the actuator 12.

Detection of the predetermined error allows necessary measures to be taken to avoid perpetuating false or erroneous position detection resulting from the disconnected arm 14 and/or device 16 or inadvertent movement of the arm 14 and device 16. This allows the controller 34 to intelligently detect the occurrence of mechanical failure in the arm 14 for troubleshooting purposes, and the like. Moreover, the sensor 32 is prevented from detecting the device 16 at an unintended position because when the device 16 disconnects from the actuator 12 (via e.g., breakage in the arm 14), the device 16 becomes undetectable thereby providing an additional degree of safety.

Those skilled in the art appreciate that the various steps of the methods 100, 200 described herein may have other functions not specifically recited herein without departing from the spirit of the invention. Moreover, the advantages of the methods 100, 200 are not limited to those described herein. As such, those skilled in the art appreciate that the methods 100, 200 may provide other advantages not specifically recited herein.

V. Other Embodiments

Various embodiments of the system, 10, apparatus 15, and methods 100, 200 are described herein.

The actuator 12 may have various configurations. The actuator 12 may comprise a motor that controls or moves any suitable mechanism for moving the arm 14 and/or device 16. The actuator 12 may drive any suitable type of motion, such as linear (straight line/push pull), rotary (circular) or oscillatory motion. The actuator 12 may move according to any suitable speed and/or force. In one embodiment, the actuator 12 is an electric linear actuator is that converts the rotational motion of a low voltage DC motor into linear, push and pull movements. The actuator 12 may drive such linear movement merely in response to pushing a button, turning a knob, or other user input. The actuator 12 may be a mechanical actuator, a hydraulic actuator, a pneumatic actuator, a piezoelectric actuator, an electro-mechanical actuator, and the like. Those skilled in the art appreciate that the actuator 12 may have any other suitable configuration not specifically described herein.

The arm 14 may directly connect to the actuator 12. Alternatively, as shown in FIGS. 1, 4, 6 and 7, for example, the arm 14 may indirectly connect to actuator 12 via a member 50, such as a rod, connected to the actuator 12. In one example, the rod 50 defines a proximal end 50a and an opposing distal end 50b. The proximal end 50a is connected to the actuator 12 and moves in direct response to driving by the actuator 12. In this embodiment, the actuator 12 is configured to concurrently move the arm 14 and the device 16 by moving the rod 50. Specifically, as shown, the rod 50 moves linearly in and out of the actuator 12. As such, the actuator 12 is configured to concurrently move the rod 50, arm 14, and device 16 linearly. The member 50 may have various other configurations other than the rod 50 illustrated in the Figures. Additionally, the arm 14 may connect to the actuator 12 using any suitable type and number of intermediate members 50.

The arm 14 may connect perpendicularly with respect to the actuator 12 and rod 50, as shown in FIGS. 1, 4, 6 and 7. Alternatively, the arm 14 may connect to the actuator 12 and/or rod 50 according to any other suitable configuration, angle, orientation, and/or method.

In one embodiment, the arm 14 comprises a first end 14a and an opposing second end 14b. The first end 14a is connected to the device 16 and the second end 14b is connected to the distal end 50b of the rod 50. The arm 14 may be connected to the rod 50 or integrally formed into the rod 50.

Breakage between the device 16 and the actuator 12 has been described above. In instances where the rod 50 is present, such breakage may occur by virtue of the rod 50 driven by the actuator 12. For example, as shown in FIG. 4, a lower portion 14a of the arm 14, which is defined on the lower side of the mechanical weakness 22, remains connected to the rod 50. Meanwhile, an upper portion 14b of the arm 14, which is defined on the upper side of the mechanical weakness 22, remains connected to the device 16. Despite presence of the rod 50, the arm 14 nevertheless remains disconnected from the actuator 12. In other words, the terminology "disconnected from the actuator" is not intended to limit the invention to only having an entirety of the device 16 or arm 14 be disconnected. Rather, as shown in FIG. 4, portions of the arm 14 may remain connected to the actuator 12 while other portions are disconnected. In addition, an entirety or a portion of the device 16 may remain connected to the actuator 12 while other portions are disconnected. The arm 14 may have various configurations other than shown in the Figures. For example, the arm 14 may have any suitable geometrical configuration, such as a cylinder, a rectangular prism, a planar (flat) shape, or the like. The arm 14 may be connected to the actuator 12 according to any suitable fashion. For example, the arm 14 may be molded or adhered to the actuator 12 and/or member 50. Alternatively, the arm 14 may be mechanically connected to the actuator 12 and/or member 50 using any suitable interconnecting linkages, or parts.

In one embodiment, the arm 14 is configured to be flexible. This way, the arm 14 can withstand sheer forces on the arm 14 resulting from driving by the actuator 12. The arm 14 may be configured to be flexible using any suitable technique. In one example, the arm 14 may comprise a flexible material. In another example, the arm 14 may be defined with a predetermined thickness to provide flexibility. Alternatively, the arm 14 may comprise a biasing member, such as a flat spring, a coil spring, and the like. The arm 14 may comprise steel or plastic in certain embodiments.

The mechanical weakness 22 in the arm 14 or device 16 may have various configurations. The mechanical weakness 22 may be defined on any suitable side of the arm 14 or device 16, such as a side that is subjected to sheer force resulting from driving by the actuator 12. The arm 14 or device 16 may also comprise a plurality of mechanical weaknesses 22.

In one example, the mechanical weakness 22 may be integrally formed into the arm 14 or device 16. For instance, the mechanical weakness 22 may be further defined as a notch, as illustrated in FIGS. 1, 2, and 4. The notch may be defined according to any suitable geometrical configuration. For example, the notch may be semi-circular, triangular, and the like. In another example, as shown in FIGS. 8 and 9, the mechanical weakness 22 is defined by a thinning or twisting of the arm 14 or device 16 along its length L at a predetermined portion. Alternatively, the mechanical weakness 22 may be defined by a compositional or material difference in a portion of the arm 14 or device 16. Such portion is mechanically weaker than other compositions or materials in the remainder of the arm 14 or device 16. In such configurations, the arm 14 or device 16 may have a constant thickness and there may be no need for thinning.

Alternatively, the mechanical weakness 22 may be a separate component attached to the arm 14. For example, the mechanical weakness 22 may comprise a break-away member, linkage, or the like. Such break-away members may facilitate mechanical connection between the portions 14a, 14b of the arm 14. The sensor 32 may have any suitable configuration. Examples of the sensor 32 include, but are not limited to, RF sensors, magnetic sensors, capacitive sensors, inductive sensors and magnetoresistive sensors. Magnetoresistive sensors may include anisotropic magnetoresistive (AMR) sensors, tunnel magnetoresistance (TMR) sensors, or the like. The sensor 32 may be passive (not directly powered) or active (powered).

The sensor 32 may be integrated in a larger assembly or may stand-alone. The sensor 32 may be a printed circuit board (PCB) embedded sensor. The sensors 32 may be embedded onto the PCB using any suitable technique, such as soldering, and the like. Additionally, any suitable number of sensors 32 may be utilized. For example, each position (P) may include a dedicated sensor 32. Alternatively, one sensor 32 may be utilized to detect the device 16 at every position (P).

The controller 34 is in communication with the sensor(s) 32 and is configured to perform position detection and error detection based on contactless detection of the device 16. The controller 34 may be disposed in any location suitable for the system 10. The controller 34 may be integrated into a single component along with the sensor 32. Alternatively, the controller 34 may stand-alone. The controller 34 may comprise any suitable components for facilitating position and error detection. For example, the controller 34 may comprise a memory, such as RAM, NVRAM, EEPROMs or the like. Any suitable data, bits, or other information may be stored in the memory. The controller 34 may also include any suitable integrated circuits (ICs), ASICs, processor(s), digital signal processors (DSPs), clocks, or the like. The controller 34 may also be a microcontroller, such as a system-on-chip (SOC) controller, and the like. The controller 34 may also execute any suitable firmware or software for implementing at least the techniques described herein. The controller 34 may have other configurations not described herein without departing from the scope of the invention.

VI. Applications

Figure 14:
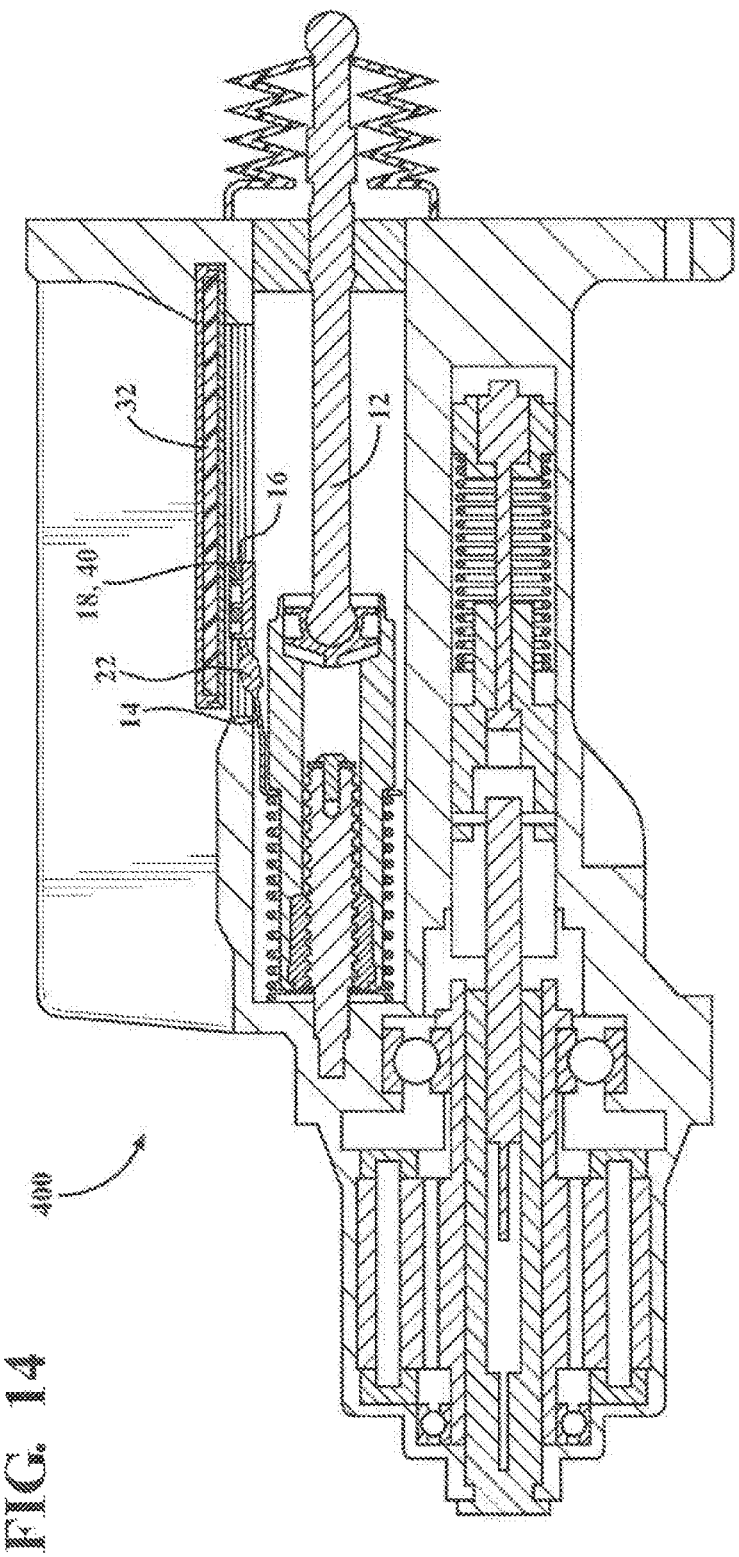
FIG. 14 is a cross-sectional view of one embodiment of a clutch actuator having the actuator, device and sensor integrated therein wherein the actuator is in a first state.
Figure 15:
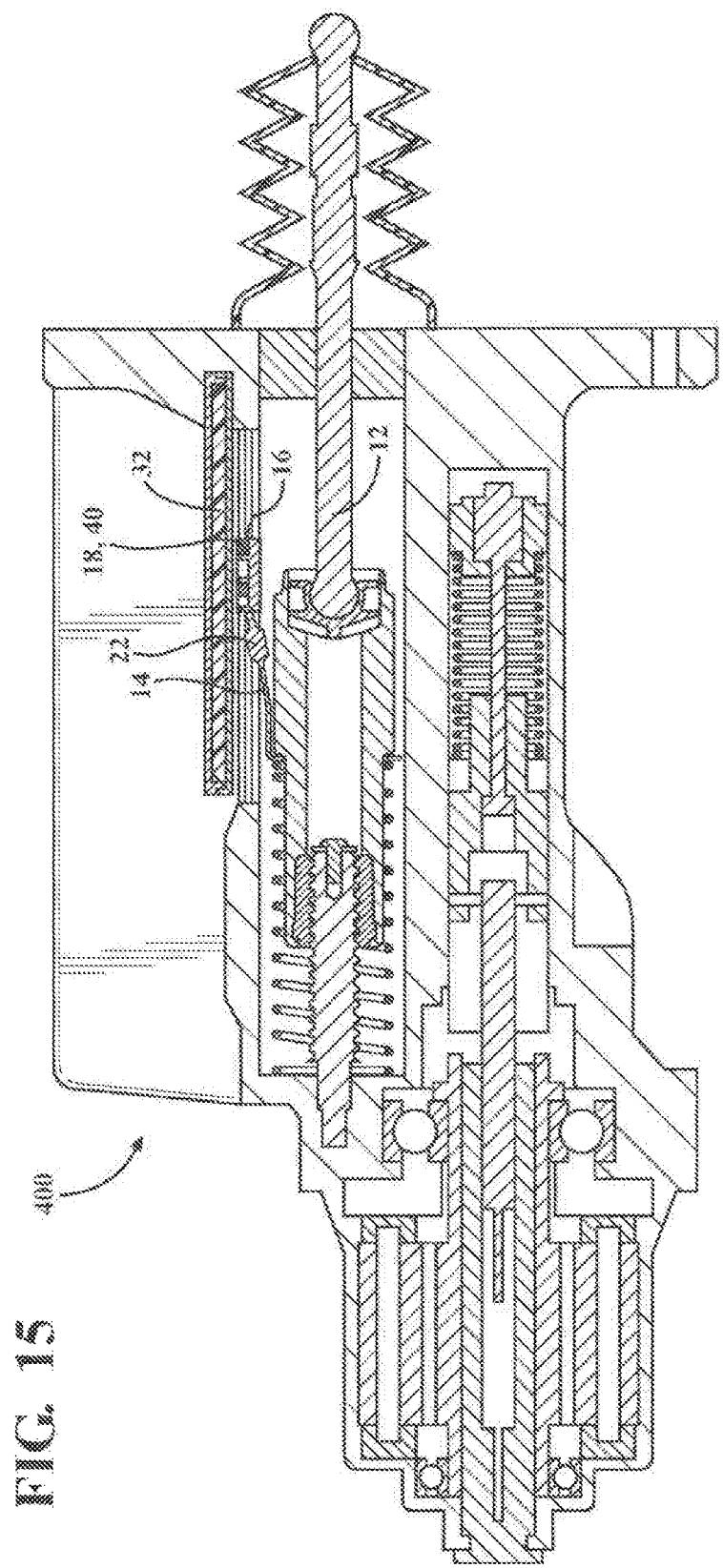
FIG. 15 is the clutch actuator of FIG. 14 wherein the actuator is in a second state.

The system 10, apparatus 15 and methods 100-300 may be utilized in various applications, such as automotive or industrial applications. In one embodiment, as shown in FIGS. 13-15, the components and techniques are utilized in an assembly 400 for a vehicle system.

In one embodiment, any or all of the components of the system 10, i.e., the actuator 12, apparatus 15, sensor 32, and controller 34 may be incorporated within the assembly 400. As such, the assembly 400 may provide a "plug and play" solution for automotive applications.

For example, the assembly 400 may be a clutch actuator 400 for a transmission 402. In one embodiment, the clutch actuator 400 is a pneumatic clutch actuator or an electro-pneumatic clutch actuator for use in automated manual transmission (AMT) applications and clutch by wire (CBW) solutions.

Figure 13:
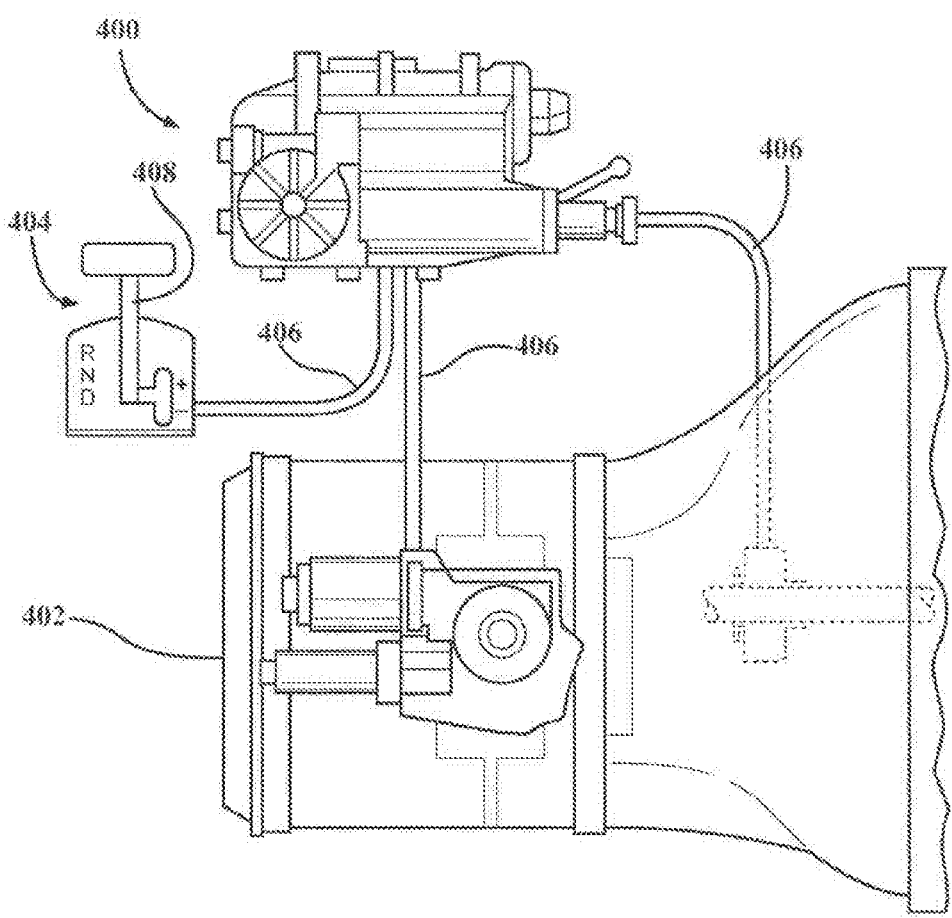
FIG. 13 is a vehicle system diagram illustrating application of the system in environmental use in a clutch actuator for the vehicle system.

As shown in FIG. 13, the clutch actuator 400 is connected between the transmission 402 and a shifter assembly 404 disposed in a passenger compartment of the vehicle. The clutch actuator 400 connects to the shifter assembly 404 and the transmission 402 via mechanical cables 406. For simplicity, the specific components of the clutch actuator 400 are not specifically described herein. The shifter assembly 404 may be any suitable type, such as manual, mechanical, electronic, shift-by-wire, manumatic, monostable, or any other configuration not specifically recited herein. The configuration of shifter positions may vary depending on the configuration of the shifter assembly.

The clutch actuator 400 enables electronic control of transmission 402 gears via control of the shifter assembly 404. In response to shifter assembly 404 actuation, the actuator 12 in the clutch actuator 400 moves the device 16 between the predetermined positions as described above. The system 10, apparatus 15 and methods 100-300 provide continuous monitoring and error detection of the clutch position.

FIG. 14 shows a cross-sectional view of one embodiment of the clutch actuator 400. The device 16 is in a first position in response to a first actuation from the shifter assembly 404 to the clutch actuator 400. FIG. 15 shows the device 16 in a second position in response to a second actuation from the shifter assembly 404 to the clutch actuator 400. As described herein, the device 16 or arm 14 may disconnect from the actuator 12 due to frequent clutch actuations. If this happens, the device 16 is intentionally is made undetectable, according to the techniques described herein. By doing so, the controller 34 identifies that the predetermined error has occurred relating to disconnection of the device 16 from the actuator 12 in the assembly 400.

It is to be appreciated that any of the techniques and embodiments described in the sections above may be applied fully to the embodiments described in this section. Furthermore, the clutch actuator 400 may have any suitable configuration and may be of any suitable type, e.g., electronic, pneumatic, electro-pneumatic, hydraulic, or the like. Additionally, other types of transmission management devices are contemplated, such as clutch master cylinder control devices, clutch servos, servo-shift modules, electronic gear control units, and the like.

In another embodiment, the system 10, apparatus 15 and methods 100-300 are utilized for the shifter assembly 404 in the passenger compartment. In one example, the shifter assembly 404 detects movement of a shift lever 40. In such configurations, the actuator 12 is mechanically or electrically responsive to movement of the shift lever 408. The controller 34 may detect shift lever 408 movement and direct the actuator 12 accordingly. In this embodiment, the shifter assembly 404 includes a housing and the shift lever 408 is coupled to the housing. The shift lever 408 is configured to move with respect to the housing between predetermined shifter positions. The positions of the device 16 correspond to the plurality of shifter positions. As the shift lever 408 moves to one of the shifter positions, the actuator 12 effects movement causing the device 16 to move to the position corresponding to the shifter position. The controller 34 is configured to determine the shifter position based on contactless detection of the device 16 by the sensor 32.

Additionally, those skilled in the art appreciate that the system 10, apparatus 15 and methods 100, 200 may be implemented in non-transmission related automotive applications, such as adjustable seat systems, lumbar control systems, door position systems, foot pedal systems, steering position systems, and the like. Furthermore, the system 10, apparatus 15 and methods 100, 200 may be implemented in non-automotive applications, such as aerospace, military, marine applications, and the like.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system comprising:
   an actuator;
   an arm coupled to said actuator, said arm comprising a mechanical weakness intentionally defined along a portion of a length of said arm, wherein said mechanical weakness is defined as one or more of a notch, a thinning of a material of said arm, and a twisted portion of said arm;
   a device being connected to said arm and with said actuator being configured to move said device between a plurality of predetermined positions, and wherein said device is configured to disconnect from said actuator at said mechanical weakness;
   a biasing member being coupled to said device;
   a sensor being configured to contactlessly detect said device when said device is connected to said actuator; and a controller in communication with said sensor and being configured to determine the predetermined position of said device based on contactless detection of said device by said sensor when said device is connected to said actuator; and wherein said biasing member is configured to position said device beyond a detectable range of said sensor in response to disconnection of said device from said actuator at said mechanical weakness.

2. The system of claim 1 wherein:

said device is spaced apart from said sensor by a first predetermined distance being within the detectable range of said sensor when said device is connected to said actuator; and said biasing member is configured to position said device to become spaced apart from said sensor by a second predetermined distance being beyond the detectable range of said sensor when said device disconnects from said actuator.

3. The system of claim 1 wherein said controller is further configured to identify a predetermined error in response to said device being beyond the detectable range of said sensor.

4. The system of claim 1 wherein said actuator is configured to move said device in a linear direction.

5. The system of claim 1 further comprising a guide member being configured to guide movement of said device between the plurality of predetermined positions and to support said device after disconnection of said device from said actuator.

6. The system of claim 1, wherein said biasing member is directly connected to said device.

7. The system of claim 1, wherein said biasing member is indirectly coupled to said device by being coupled to said arm at a portion of said arm disposed between said device and said mechanical weakness.

8. The system of claim 1 further comprising a member coupled to said actuator, and wherein said arm is indirectly coupled to said actuator by being coupled to said member.

9. The system of claim 8, wherein said actuator is configured to move said device by moving said member.

10. The system of claim 8, wherein said member comprises a length defined by a proximal end and a distal end, said member being coupled to said actuator at said proximal end and said member being coupled to said arm at said distal end.

11. The system of claim 8, wherein said arm is coupled to said member such that said arm is perpendicular to said member and to said actuator.

12. The system of claim 8, wherein said arm and said member are monolithically formed.

13. The system of claim 1, wherein said biasing member is comprises a spring.

14. The system of claim 13, wherein said biasing member comprises a first end and a second end, said second end being coupled to said device and being located between said actuator and said first end, and wherein said biasing member is configured to position said device beyond the detectable range of said sensor by compressing such that said second end moves toward said first end.

15. The system of claim 13, wherein said biasing member comprises a first end proximal to said actuator and a second end coupled to said device, and wherein said biasing member is configured to position said device beyond the detectable range of said sensor by extending such that said second end moves away from said first end.

16. A method of operating a system comprising an actuator, an arm coupled to the actuator, the arm comprising a mechanical weakness intentionally defined along a portion of a length of the arm, wherein the mechanical weakness is defined as one or more of a notch, a thinning of a material of the arm, and a twisted portion of the arm, a device connected to the actuator and being configured to disconnect from the actuator at the mechanical weakness, a biasing member coupled to the device, a sensor, and a controller in communication with the sensor, said method comprising:

moving the device with the actuator between a plurality of predetermined positions;

contactlessly detecting the device with the sensor when the device is connected to the actuator;

determining the predetermined position of the device with the controller based on contactless detection of the device by the sensor when the device is connected to the actuator; and positioning the device with the biasing member beyond a detectable range of the sensor in response to disconnection of the device from the actuator at the mechanical weakness.

17. The method of claim 16 wherein:

the step of contactlessly detecting the device is further defined as contactlessly detecting the device when the device is spaced apart from the sensor by a first predetermined distance being within the detectable range of the sensor when the device is connected to the actuator; and the step of positioning the device is further defined as positioning the device with the biasing member to become spaced apart from the sensor by a second predetermined distance being beyond the detectable range of the sensor when the device disconnects from the actuator.

18. The method of claim 16 further comprising a step of identifying with the controller a predetermined error in response to the device being beyond the detectable range of the sensor.

19. The method of claim 16, wherein the biasing member comprises a spring, a first end, and second end, the second end being coupled to the device and being located between the actuator and the first end, and wherein the step of positioning the device comprises a step of positioning the device with the biasing member by compressing such that the second end moves toward the first end.

20. The method of claim 16, wherein the biasing member comprises a spring, a first end proximal to said actuator, and second end coupled to said device, and wherein the step of positioning the device comprises a step of positioning the device with the biasing member by extending such that the second end moves away from the first end.

21. An error-detection method for a system comprising an actuator, an arm coupled to the actuator, the arm comprising a mechanical weakness intentionally defined along a portion of a length of the arm, wherein the mechanical weakness is defined as one or more of a notch, a thinning of a material of the arm, and a twisted portion of the arm, a device connected to the actuator and being configured to disconnect from the actuator at the mechanical weakness, a biasing member coupled to the device, a sensor, and a controller in communication with the sensor, said error-detection method comprising:

moving the device with the actuator between a plurality of predetermined positions;

contactlessly detecting the device with the sensor;

determining the predetermined position of the device with the controller based on contactless detection of the device by the sensor;

positioning the device with the biasing member beyond a detectable range of the sensor in response to disconnection of the device from the actuator at the mechanical weakness; and in response to the device being positioned, by the biasing member, beyond the detectable range of the sensor, recognizing with the controller an occurrence of an error identifying disconnection of the device from the actuator.

\* \* \* \* \*